(12) United States Patent  (10) Patent No.: US 8,393,585 B2
Han et al.                  (45) Date of Patent:     Mar. 12, 2013

(54) VARIABLE POSITION WORKSTATION

(75) Inventors: Samuel Han, Alberta (CA); Shannon Lundrigan, Alberta (CA); Matko Papic, Alberta (CA); Carlos Renderos, Alberta (CA)

(73) Assignee: Evans Consoles Corporation, Calgary (CA)

( * ) Notice: Subject to any disclaimer, the term of this patent is extended or adjusted under 35 U.S.C. 154(b) by 214 days.

(21) Appl. No.: 12/826,250

(22) Filed: Jun. 29, 2010

(65) Prior Publication Data

US 2010/0327137 A1    Dec. 30, 2010

Related U.S. Application Data

(60) Provisional application No. 61/221,264, filed on Jun. 29, 2009.

(51) Int. Cl.
    *F16M 13/00*    (2006.01)
(52) U.S. Cl. ........................................ 248/158; 248/166
(58) Field of Classification Search .................. 248/158, 248/146, 151, 166, 167, 170; 211/94.01, 211/13.1, 193, 195; 108/50.01, 50.02, 152, 108/143; 312/223.3, 196
    See application file for complete search history.

(56) References Cited

U.S. PATENT DOCUMENTS

| | | | |
|---|---|---|---|
| 2,893,568 A | 7/1959 | Scholz | |
| 3,087,186 A | 4/1963 | Budd | |
| 4,838,177 A | 6/1989 | Vander Park | |
| 5,083,512 A * | 1/1992 | Newhouse et al. | 108/50.02 |
| 5,775,521 A * | 7/1998 | Tisbo | 211/94.01 |
| 5,901,513 A * | 5/1999 | Mollenkopf et al. | 52/220.7 |
| 6,164,467 A | 12/2000 | DePottery et al. | |
| 6,550,725 B1 * | 4/2003 | Watson | 248/146 |
| 6,561,062 B2 * | 5/2003 | Miller | 82/115 |
| 6,578,498 B1 | 6/2003 | Draudt et al. | |
| 6,712,433 B2 * | 3/2004 | Hellwig et al. | 312/223.6 |
| 7,641,056 B2 * | 1/2010 | Schulman | 211/11 |
| 7,669,815 B2 * | 3/2010 | Clewett | 248/166 |
| 2007/0209559 A1 | 9/2007 | Mockel | |
| 2008/0035031 A1 * | 2/2008 | Yamanishi et al. | 108/50.02 |
| 2009/0000750 A1 | 1/2009 | Hardt, II et al. | |
| 2011/0001406 A1 * | 1/2011 | Han et al. | 312/236 |

FOREIGN PATENT DOCUMENTS

| | | |
|---|---|---|
| CA | 2257098 A1 | 12/1997 |
| DE | 1160146 | 12/1963 |
| DE | 202006003762 | 7/2007 |
| FR | 1269036 | 6/1960 |

* cited by examiner

*Primary Examiner* — Ramon Ramirez
(74) *Attorney, Agent, or Firm* — Notaro, Michalos & Zaccaria P.C.

(57) ABSTRACT

The present invention relates to a framework for supporting pieces of equipment or other objects, and in particular to a variable position workstation for supporting work surfaces and/or electronic equipment such as computers, video displays, keyboards and the like. The workstation structure in one embodiment generally comprises a stand having a pair of spaced apart upright supports, a lateral support extending between the upright supports and having mounting means for mounting equipment from the stand. The mounting means typically allow for the positioning of a work platform or other piece of equipment at one of a plurality of different horizontal and vertical positions on the stand, thereby providing flexibility for the user. In addition, stand can comprise at least two foldable feet for maintaining the workstation in an upright position. The feet may be folded when the workstation is not in use to reduce the overall footprint of the workstation.

19 Claims, 8 Drawing Sheets

VARIABLE POSITION WORKSTATION

CROSS-RELATED APPLICATION

The present application claims priority under Title 35, §U.S.C. 119(e) on U.S. provisional application No. 61/221,264, filed Jun. 29, 2009, which is incorporated here by reference.

FIELD

The present invention relates to a framework for supporting pieces of equipment or other objects, and in particular to a variable position workstation for supporting work surfaces and/or electronic equipment such as computers, video displays, keyboards and the like.

BACKGROUND

Tables, desks and consoles are known in the art. While they all generally provide a work surface that can be used as, among other things, a writing surface and for supporting equipment or objects, and each generally has its own advantages and disadvantages. For example, consoles are typically used in the place of generic office equipment since consoles often provide an enhanced human machine interface by positioning equipment in the most useful and efficient locations. In many instances, consoles are purpose-built for use in a specific application. Furthermore, consoles are often adapted to receive and support more equipment than most existing desks. However consoles are typically big and/or heavy, making them somewhat difficult to move and transport. Thus consoles are generally not well suited for use as portable or temporary workstations. In contrast, tables and desks are often lighter and are therefore easier to move. The legs of some tables and desks are foldable or removable, making it easier transport and store such tables and desks. However, existing tables and desks typically lack the functionality of consoles. In particular, existing tables and desks usually have a flat work surface on which equipment and other objects may be supported. However, a flat work surface is not always the most effective or ergonomic way to mount or support equipment that is to be used by an operator. Furthermore, desk and tables typically lack the ability to effectively receive and support a lot of equipment when compared to consoles.

For the foregoing reasons, it can be appreciated that a need exists for a versatile workstation structure that offers some of the benefits of a console but that is also easily transportable and storable.

SUMMARY

The present disclosure provides a workstation structure for supporting equipment and other accessories therefrom. The workstation structure in one embodiment generally comprises a stand having a pair of spaced apart upright supports, a lateral support extending between the upright supports and having mounting means for mounting equipment from the stand. The mounting means typically allow for the positioning of a work platform or other piece of equipment at one of a plurality of different horizontal and vertical positions on the workstation, thereby providing flexibility for the user. In addition, the workstation, when combined with a stand, can comprise at least two foldable feet for maintaining the stand in an upright position. The feet may be folded when the workstation is not in use to reduce the overall footprint of the workstation. This can be beneficial when the workstation is being transported or stored.

According to the present invention then, there is provided a stand structure for supporting equipment therefrom, the stand comprising a front side and a back side; two spaced apart upright supports; a lateral support disposed between and connected to the upright supports, the lateral support comprising mounting means allowing equipment to be mounted at a one of a plurality of different horizontal and vertical positions on the stand; and two bases, each base being disposed at the bottom of a one of the two upright supports for maintaining the stand in an upright position.

BRIEF DESCRIPTION OF THE DRAWINGS

Preferred embodiments of the present invention will now be described in greater detail and will be better understood when read in conjunction with the drawings in which.

DETAILED DESCRIPTION

In some applications, it is desirable to have a workstation that can be set up quickly and easily, and allows equipment and other accessories to be arranged in any desired configuration depending on the user's needs and requirements.

In order to accommodate various types of equipment and user requirements, the workstation of the present invention is provided with mounting means that allow equipment to be mounted on a cooperating stand at one of a plurality of different horizontal and vertical positions.

The various features and components of the present workstation structure are now described with reference to the Figures.

Figure 1A:
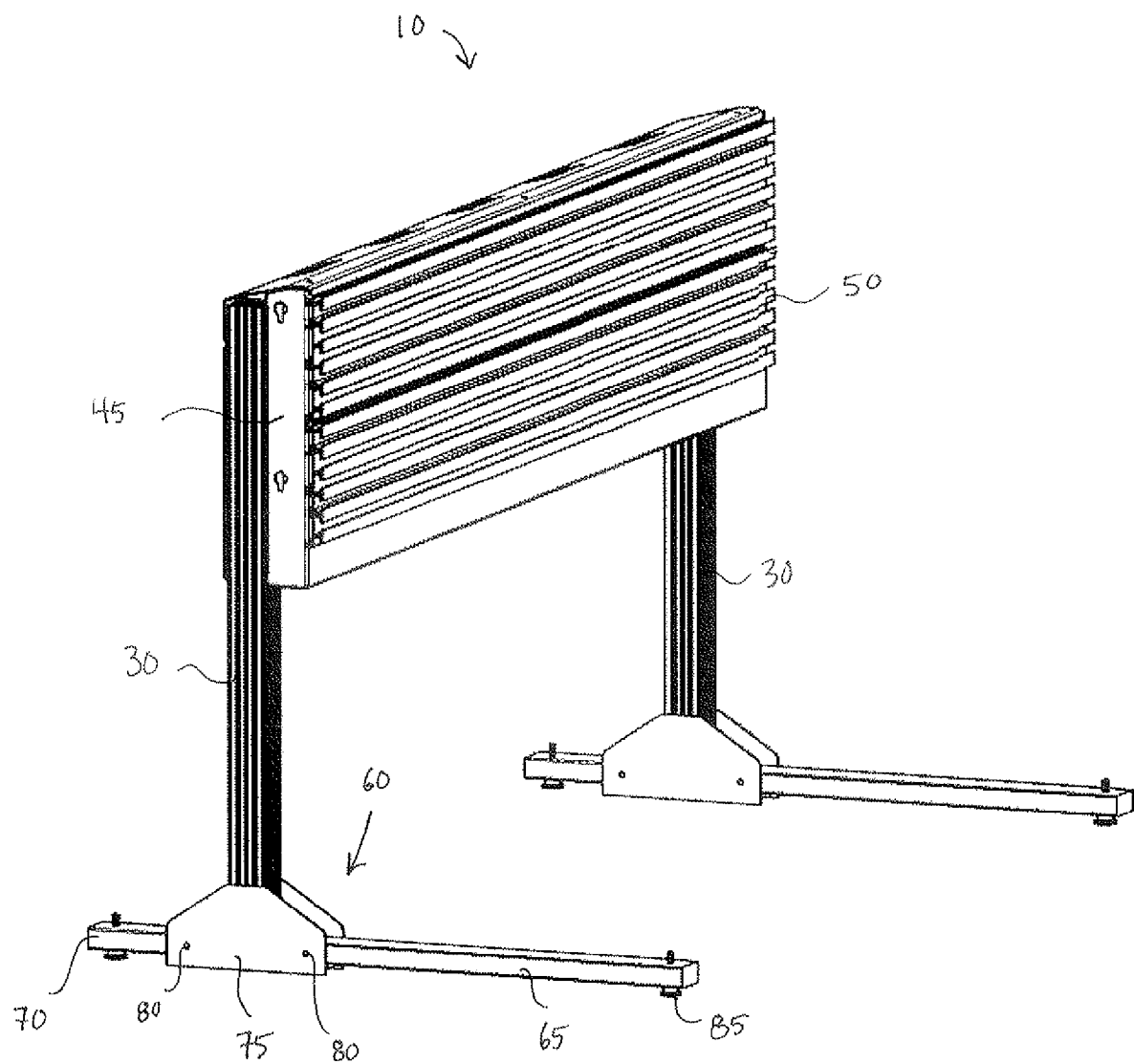
FIG. 1A is a perspective front view of one embodiment of the stand of the present invention.
Figure 1B:
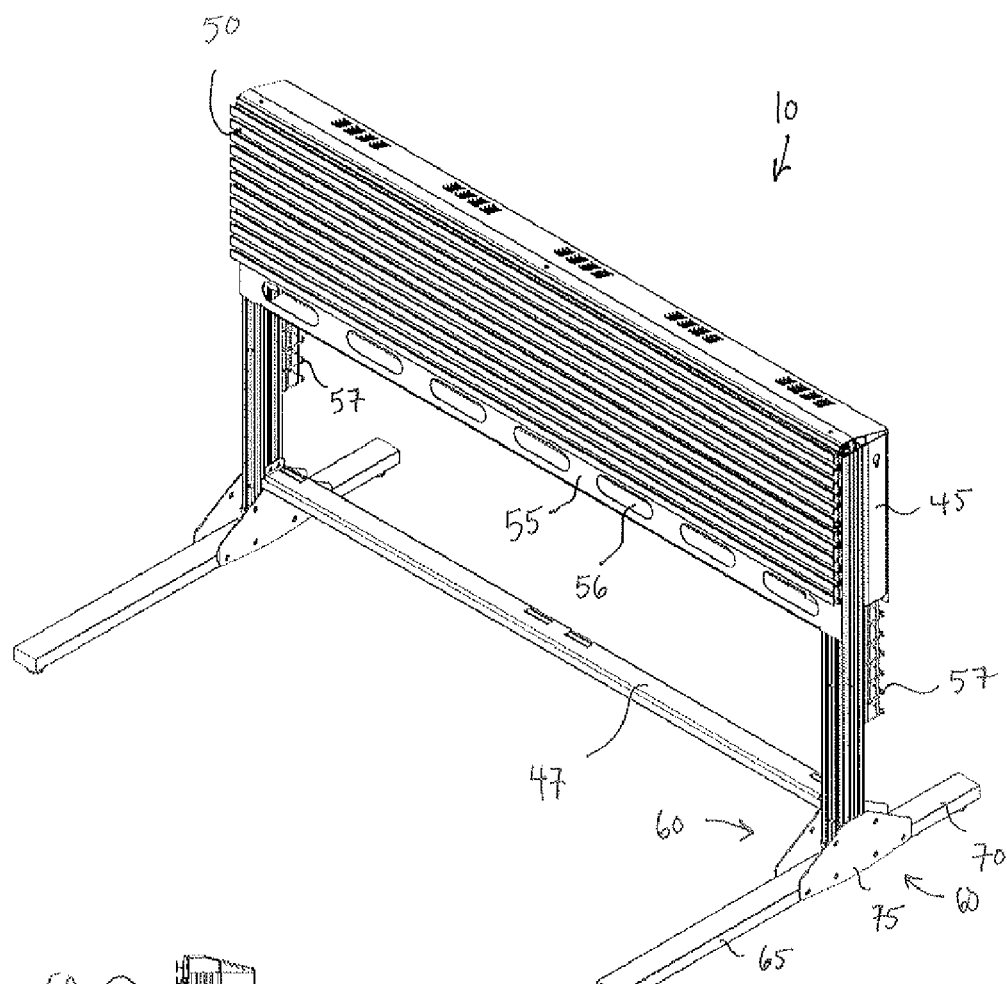
FIG. 1B is a perspective front view of another embodiment of the stand of the present invention.

FIG. 1A shows one embodiment of a stand in accordance with the present invention. The stand 10 generally comprises a two spaced apart upright supports 30, a lateral support 45 disposed between and connected to upright supports 30, and two bases 60, each base being disposed at the bottom of a one of the two upright supports 30 for maintaining stand 10 in an upright position. Lateral support 45 comprises mounting means 50 at least on the front side of the stand to allow equipment to be mounted at a one of a plurality of different horizontal and vertical positions on the stand.

Upright supports 30 generally support lateral support 45 and mounting means 50 above the floor or ground, and will therefore typically be strong and rigid. Upright supports 30 can be in the form of posts or any other suitable form. As shown in FIG. 1A, in least one embodiment, upright supports 30 will be in the form of extrusions. In addition, upright supports may be made of any suitable material known in the art, including metal, such as aluminum or steel.

Lateral support 45 joins upright supports 30 and can have any suitable shape or form. In at least one embodiment, as shown in the Figures, lateral support 45 is in the form of a box-like structure, which is strong and rigid, yet lightweight. However, it will be appreciated by those skilled in the art that lateral support 45 can have any other suitable form.

Mounting means 50 provides a mode of attachment for equipment or other objects that are to be mounted on stand 10. In at least one embodiment, mounting means 50 allows one or more pieces of equipment or other objects to be mounted on stand 10 in any desired arrangement, meaning in any one of several different horizontal and/or vertical positions on stand 10. Those skilled in the art will appreciate that there are many different ways and systems of mounting one or more objects in such a way, including but not limited to slatwall systems, pegboard systems, wall track systems and rail panel systems. The ability of the present stand to allow equipment to be mounted in any desired position on the stand is unlike existing portable desks and tables, which typically comprise a flat work surface on which equipment can be supported. Thus existing tables do not allow equipment be positioned in the most useful and effective locations. Although some existing tables have height adjustable work surfaces, equipment and other objects are still generally supported on the flat work surface, which is not always ideal.

In the embodiment of the stand shown in the Figures, mounting means 50 are in the form of a slatwall and are disposed on the front side of stand 10. However, mounting means 50 can be positioned at other locations on stand 10, including on the back side of the stand. It will be further appreciated that lateral support 45 may be separate from mounting means 50, or that mounting means 50 may itself form lateral support 45. For example, slatwall 50 may also constitute lateral support 45. In such a case, a separate lateral support structure is not required. However, mounting means 50 will need to be sufficiently strong and rigid to provide the necessary structural integrity to stand 10.

Figure 3:
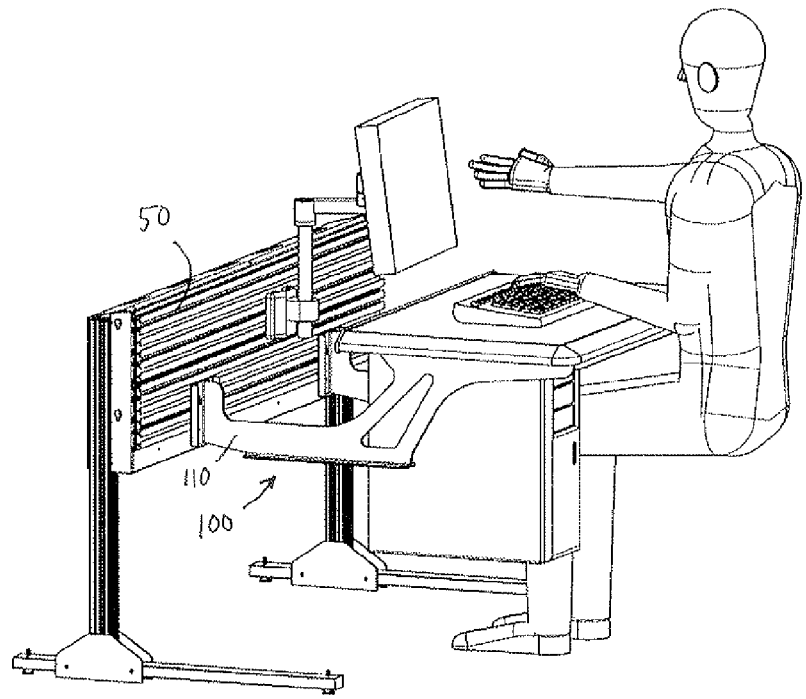
FIG. 3 is a perspective front view of the embodiment shown in FIG. 1 with a workstation and a display mounted thereon.

Lateral support 45 and mounting means 50 can be positioned at any desired height on upright supports 30. In at least one embodiment, mounting means 50 are vertically positioned on supports 30 at an ergonomically suitable height for a person sitting or standing at the stand. For example, FIG. 3 shows stand 10 being used as one component of a workstation. Several accessories are shown mounted on stand 10 and the outline of a person sitting at the stand is also shown. Mounting means 50 are positioned at a height on upright supports 30 such that any equipment or other accessories that are mounted on mounting means 50 are at a desirable height for a user.

As can be seen in FIG. 1A, in at least one embodiment, the space between the lower portions of upright supports 30 can be open. In other words, lateral support 45 and mounting means 50 need not extend or be positioned at the lower portions of upright supports 30. This may be acceptable or even desirable when there is no need to mount equipment at low positions. Furthermore, this reduces the amount of material required for stand 10 and also reduces the weight of the stand. In the event that there is a need to support an object at a low position, a downwardly extending bracket can be used to suspend the object at the low position from mounting means 50. However, it is to be appreciated that mounting means 50 can be sized and positioned to meet the end user's requirements. For example, in an alternative, mounting means 50 could extend to a lower position on upright supports 30 than is shown in the Figures. In addition, in the embodiment shown in FIGS. 1B to 1E and 6, stand 10 can have a brace 47 extending between the lower portions of upright supports 30. Brace 47 provides stand 10 with some additional rigidity.

Stand 10 may also comprise cable management features to manage any cabling associated with equipment mounted on or near the stand. For example, the stand shown in FIGS. 1B to 1E and 6 comprises a raceway or cabling tray 55 disposed just below slatwall 50. Raceway 55 will typically have one or more apertures 56 to allow for the passage of cabling in and out of the raceway. Stand 10 may also comprise one or more cabling guides 57 disposed on the lower portions of upright supports 30. In one embodiment, cabling can be run from the front side of stand 10 into raceway 55 via the one or more apertures 56, then down the side of one of support columns 30 within cable guide 57 towards the floor. Those skilled in the art will appreciate, however, that other cable management features and configurations are possible.

A base 60 is disposed at the bottom of each upright support 30 to retain stand 10 in an upright position. In particular, each base 60 will typically be configured to prevent stand 10 from tipping forward or backward, particularly when equipment has been mounted on stand 10. As shown in FIG. 1A, in at least one embodiment, each base 60 comprises a first foot 65 that extends on the front side of stand 10 to prevent the stand from tipping in the direction of its front side. Each base 60 may also comprise a second foot 70 that extends on the rear side of stand 10 to prevent stand 10 from tipping in the opposite direction. One or more of first and second feet 65 and 70 can have a footing member 85, and footing member 85 can be adjustable to allow stand 10 to be levelled or to eliminate any wobbling of the stand on a floor. In addition, second feet 70 can be shorter than first feet 65 when the majority or all of the equipment is mounted on the front side of stand 10.

Furthermore, in at least one embodiment, at least one of feet 65 and 70 can be foldable to reduce the overall footprint of stand 10. More specifically, one or more of the feet can be pivotally coupled to an upright support 30 and movable between an extended position and a folded position. This may be desirable when stand 10 is not being used, for example when the stand is being transported or stored. A foldable foot can be retained or locked in its extended and its folded position using any known method, including by way of a pin. FIGS. 1A to 10 show feet 65 and 70 in an extended position, whereas FIGS. 1D and 1E feet 65 and 70 in a folded position. In at least one embodiment, at least one of feet 65 and 70 will be foldable in an upward direction toward its corresponding upright support 30 as shown in FIGS. 1D and 1E. In another embodiment, at least one foot can be foldable or rotatable in plane that is parallel to the ground, thereby allowing the foot to be turned inward when the stand is not in use. Furthermore, in yet another alternative, one or more of the feet can be releasably connected to a base 60 to allow the one or more feet to be disconnected from base 60 when stand 10 is not being used, for example during transport or storage.

Figure 1C:
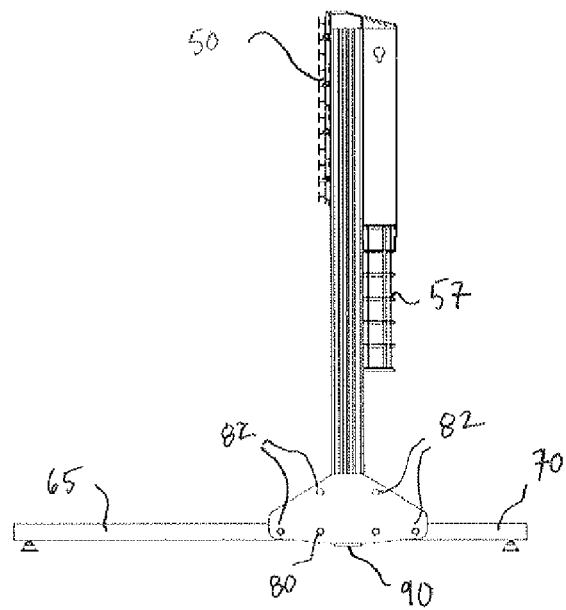
FIG. 1C is a side view of the embodiment shown in FIG. 1B.
Figure 1D:
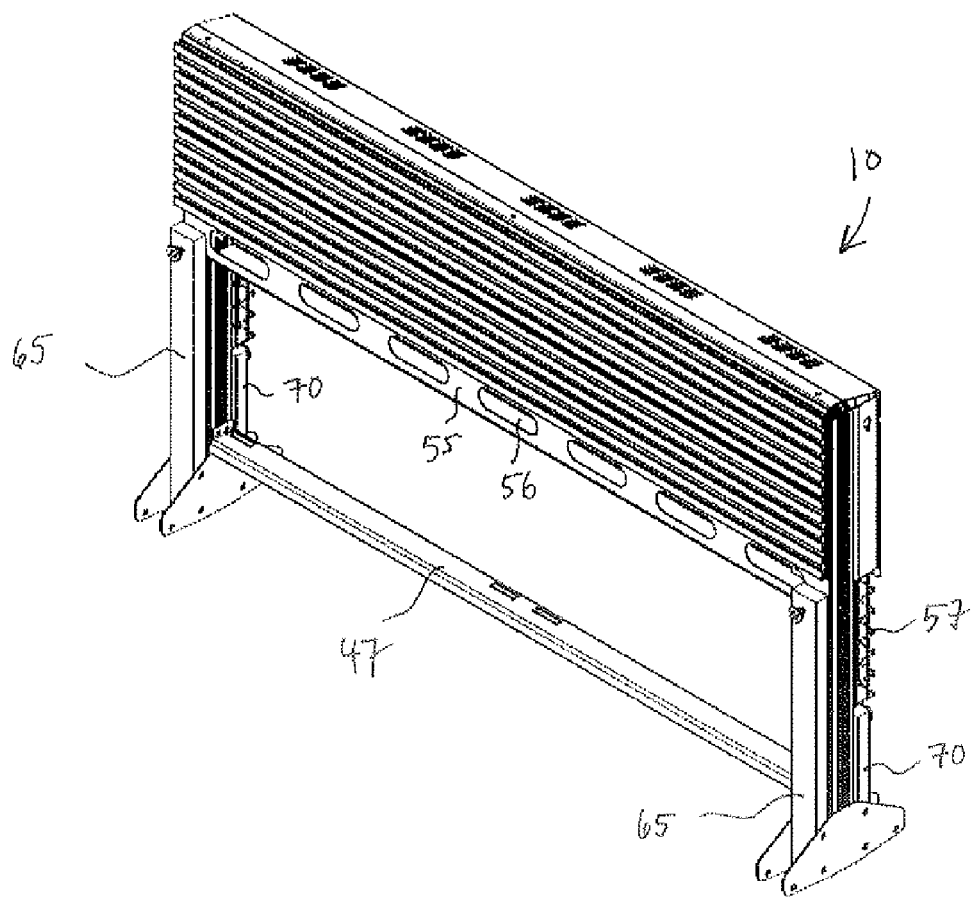
FIG. 1D is a view of the embodiment shown in FIG. 1B with the feet folded up.
Figure 1E:
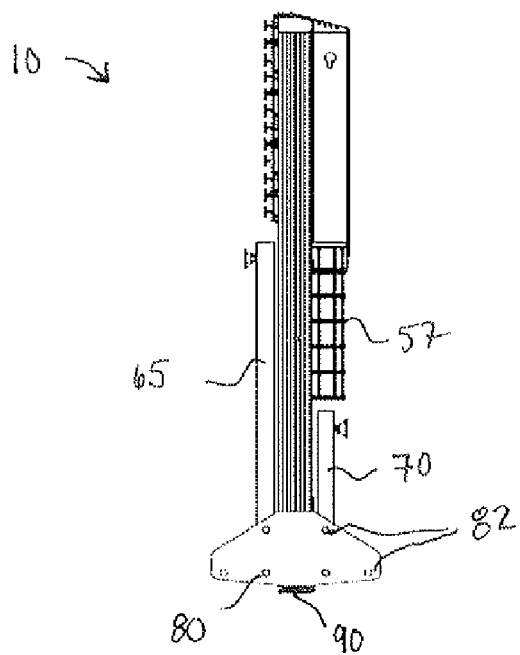
FIG. 1E is a side view of the embodiment shown in FIG. 1B with the feet folded up.
Figure 6:
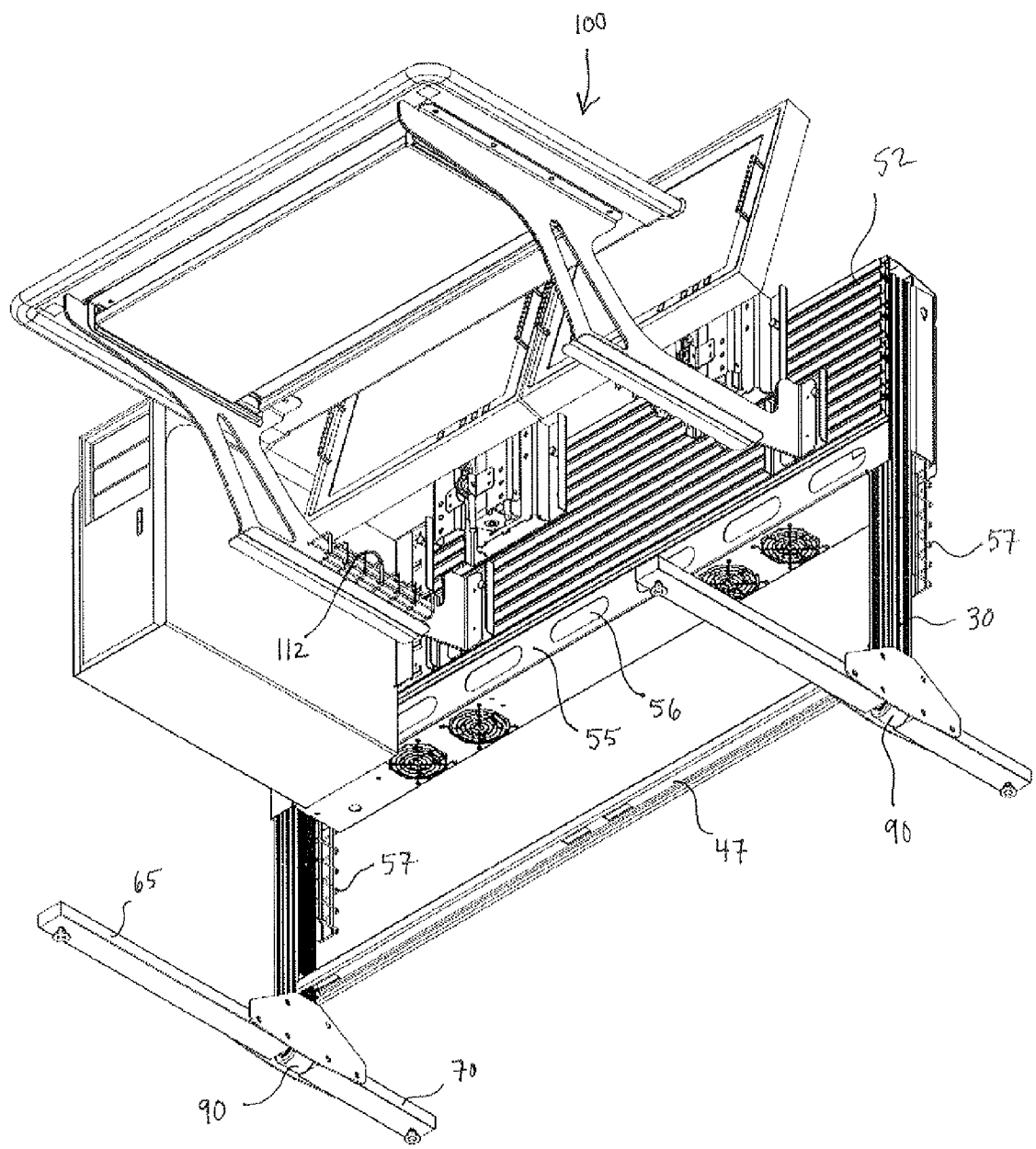
FIG. 6 is a lower perspective view of the embodiment shown in FIG. 1B with several components mounted thereon.

As shown in FIGS. 1A to 1E, each base 60 can further comprise a bracket 75 for connecting first feet 65 and possibly second feet 70 to upright supports 30. As shown in the Figures, where one or more of the feet are foldable, bracket 75 can comprise one or more pivots 80 for pivotally coupling each foldable foot to an upright support 30. As best shown in FIGS. 1C and 1E, brackets 75 can also comprise apertures 82 for receiving a bolt, pin or other obstruction to lock the one or more feet in the extended and folded positions. Furthermore, stand 10 may also comprise one or more rollers 90 at the bottom of upright supports 30 for rolling the stand when the feet are in the folded position. Rollers 90 are shown in FIG. 6. Each roller 90 can be positioned relative to feet 65 and 70 such that the roller does not contact the floor when the feet are in the extended position. In alternative, the one or more rollers 90 can be substituted for footing members 85.

Figure 2:
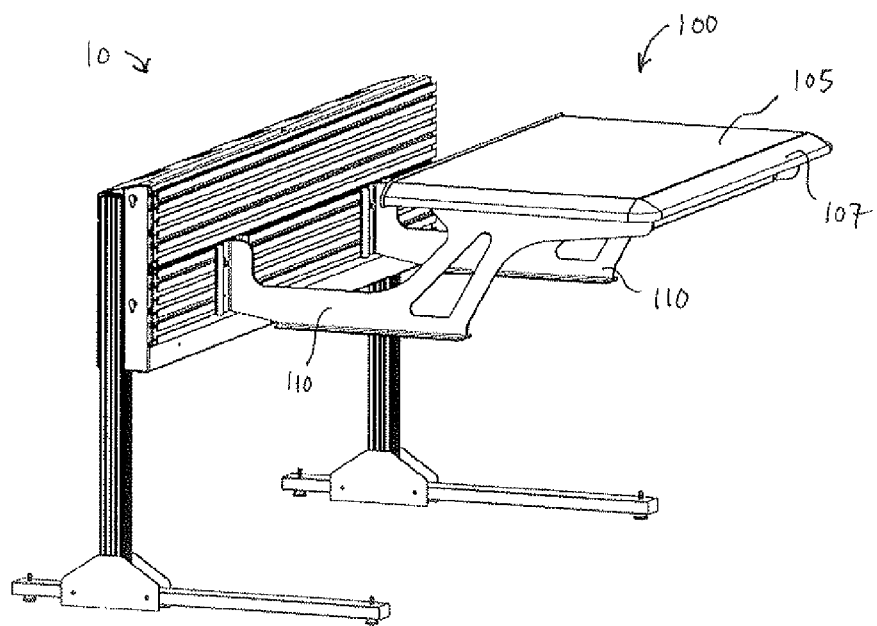
FIG. 2 is a perspective front view of the embodiment shown in FIG. 1 with a workstation mounted thereon.

As previously mentioned, stand 10 can be used to mount one or more pieces of equipment or other objects. By way of example, FIGS. 2, 3 and 6 show a workstation in the nature of a work platform 100 mounted to stand 10. As best shown in FIGS. 4A to 4F, work platform 100 generally comprises a work surface 105 and a pair of support arms 110. The ends of support arms 110 comprise mounting interfaces 115 for engagement with mounting means 50 on stand 10. Work surface 105 can be made of any suitable material, including wood and metal, with or without a surface treatment such as laminate or glass, and can be edged on one or more sides with a nosing 107, preferably made of a soft material such as urethane. In addition, work platform 100, and in particular support arms 110, will generally be rigid to resist loading forces particularly in both the up and down directions.

Figure 7:
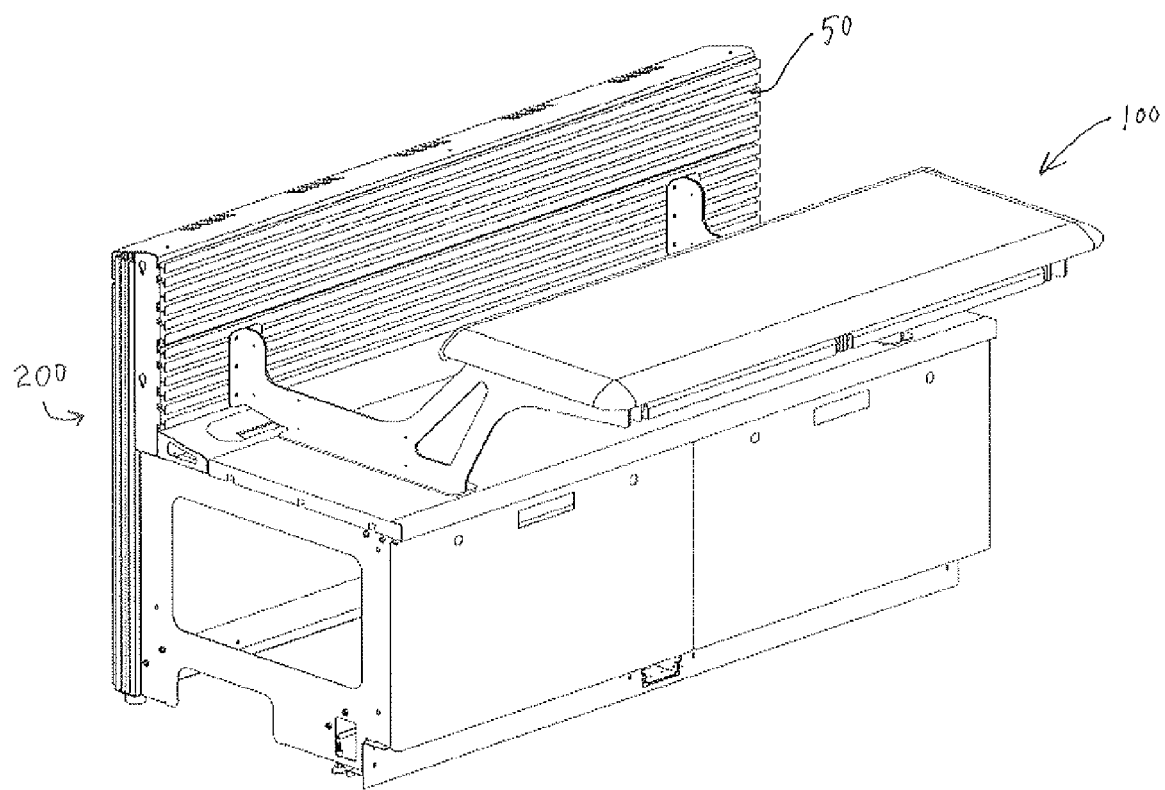
FIG. 7 is a perspective view of a workstation mounted on an equipment console.

Work platform 100 can be mounted on other structures equipped with mounting means 50. One example is shown in FIG. 7, which shows an equipment console 200 having mounting means 50 disposed on a rear side thereof and work platform 100 connected to the mounting means as will be described in greater detail below. Console 200 can be of any length, and as will also be described below, work platform 100 can be slidably moved from side to side along the length of mounting means 50 to be positioned where required by a user.

Work surface 105 can be used for any number of purposes, including as a writing surface or to support equipment or other objects. In addition, work platform 100 can be used to mount optional equipment both under and on work surface 105, such as keyboard trays, radio jack boxes, display switches, monitors, turrets, and computer processors. In one embodiment, work platform 100 incorporates cable management in support arms 110. For example, FIGS. 4A to 4F and 6 show one embodiment of work platform 100 having cabling guides 112 disposed on support arms 110. In addition, in one embodiment, work platform 100 has a load rating of 350 pounds. However, it will be appreciated that work platform 100 can be adapted to support lighter or heavier loads.

Figure 4A:
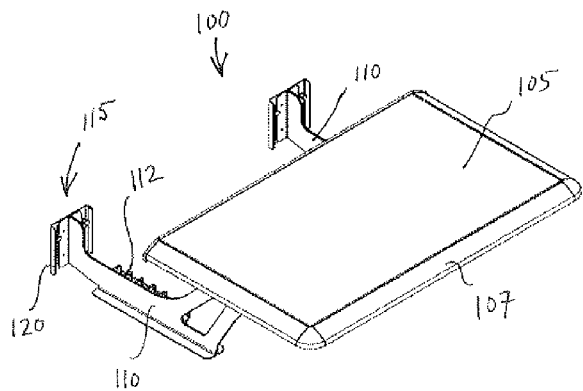
FIG. 4A is a perspective view of the workstation shown in FIG. 2 with cabling guides disposed on the support arms.
Figure 4D:
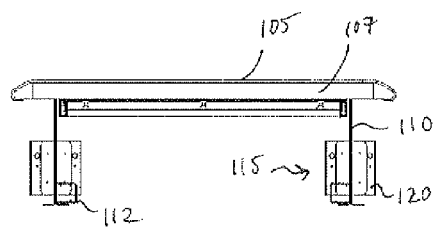
FIG. 4D is a front view of the workstation shown in FIG. 4A.
Figure 4B:
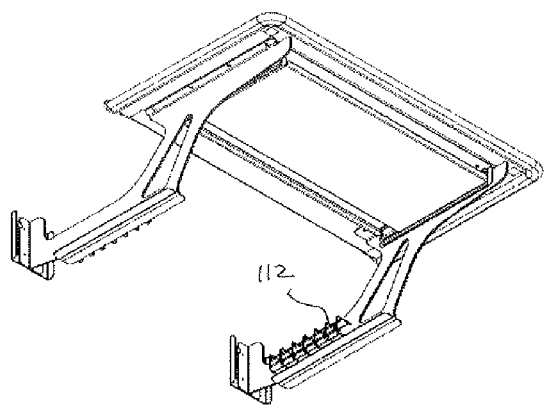
FIG. 4B is a lower perspective view of the workstation shown in FIG. 4A.
Figure 4E:
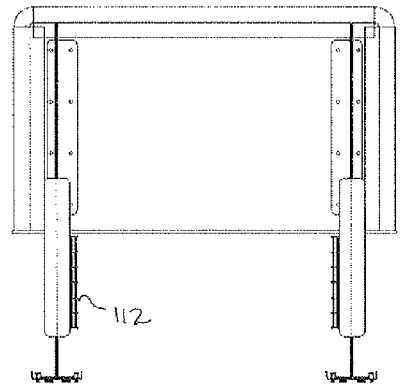
FIG. 4E is a bottom view of the workstation shown in FIG. 4A with the keyboard tray removed.
Figure 4C:
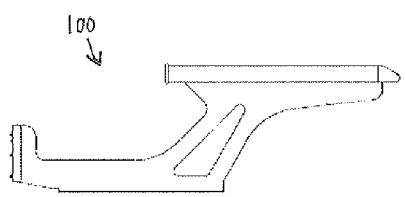
FIG. 4C is a side view of the workstation shown in FIG. 4A.
Figure 4F:
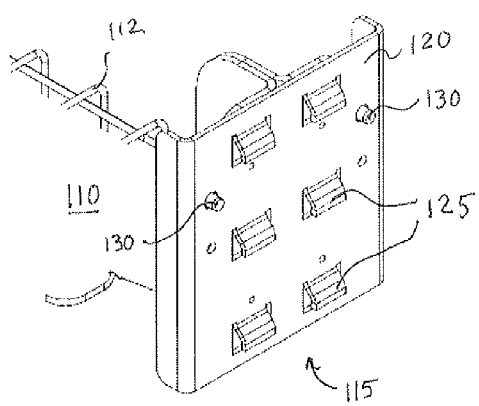
FIG. 4F is a rear perspective view of the mounting interface of the workstation shown in FIG. 4A.
Figure 5:
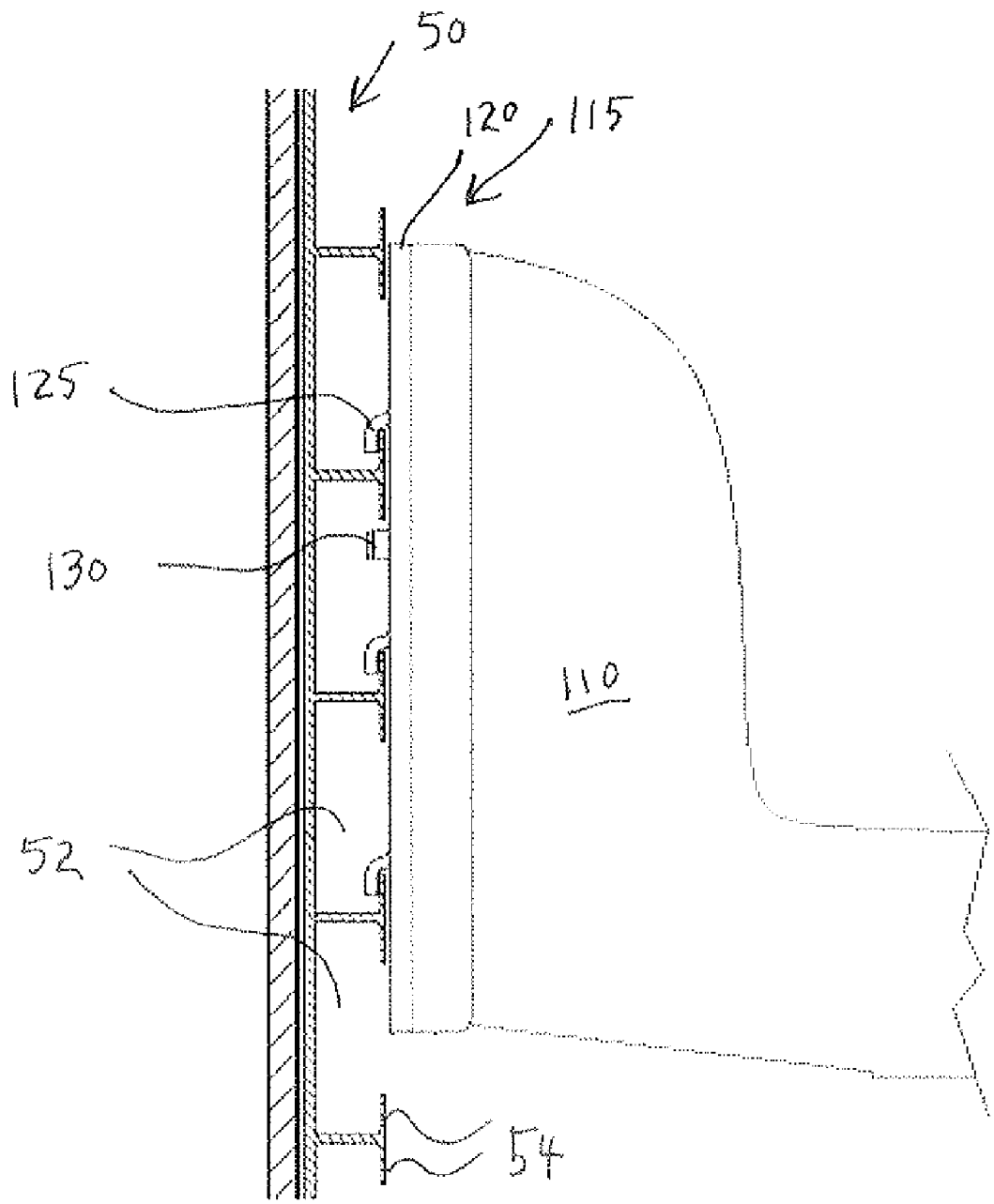
FIG. 5 is a side view of a mounting interface of the workstation engaged on a slatwall.

Mounting interfaces 115 at the ends of support arms 110 are adapted for engagement with mounting means 50 of stand 10. The particular type of mounting means 50 will typically dictate the type of mounting interfaces 115 that will be incorporated into work platform 100. For example, if mounting means 50 are in the form of a slatwall, then mounting interfaces 115 will be of the type that can engage a slatwall. For example, mounting interfaces 115 of work platform 100 shown in FIGS. 2 to 6 are adapted for engagement with the slatwall 50 of stand 10. Various types of mounting interfaces are known in the art. Having reference to FIG. 4F, in at least one embodiment each mounting interface 115 generally comprises a base or plate 120 and one or more engagement members 125 extending from plate 120 for engagement with one or more slats of a slatwall. FIG. 5 shows a side view of a mounting interface 115 engaged with a slatwall. As will be appreciated, engagement members 125 will allow mounting interface to be moved from side to side relative to the slatwall to allow work platform 100 to be conveniently located relative to said stand 10, console 200, or to some other piece of equipment, wall or other structure that includes mounting means 50.

In addition, mounting interface 115 can comprise securing means to secure mounting interface 115 to slatwall 50. For example, securing means can be in the form of securing hardware. As shown in FIGS. 4F and 5, in at least one embodiment, securing hardware 130 can be used as an obstruction to prevent the one or more engagement members 125 from disengaging the slatwall. For example, FIG. 5 shows one way by which securing hardware 130 can obstruct the removal of mounting interface 115 from slatwall 50. In the embodiment shown, mounting interface 115 is installed on slatwall 50 by positioning interface 115 proximate slatwall 50 and then moving interface 115 slightly downward to engage engagement members 125 with the slats of slatwall 50. To secure mounting interface 115 to the slatwall, securing hardware 130 is screwed or otherwise moved through a hole in plate 20 towards the slatwall until securing hardware 130 extends into one of slatwall grooves 52 and is positioned under one of the slatwall lips 54. As the removal of mounting interface 115 from slatwall 50 is achieved by lifting mounting interface 115 in an upward direction, securing hardware 130 prevents mounting interface 115 from being lifted and thereby prevents the disengagement of engagement members 125 from slatwall lips 54. When the time comes to remove mounting interface 115 from the slatwall, securing hardware 130 is moved in the opposite direction, meaning away from the slatwall, which in turn allows mounting interface 115 to be lifted upward and disengaged from the slatwall.

Securing hardware 130 can be any suitable hardware known in the art. In one embodiment, securing hardware 130 can be of the tool-less type, meaning that it can be engaged or disengaged manually without requiring the use of any tools. For example, in the case of a threaded connection, a wing bolt or wing screw could be used. Alternatively, securing hardware can be of the type that requires a tool for its engagement and disengagement, such as standard bolts and screws. In addition, specialized anti-tampering or anti-theft hardware could also be used. An example of this type of hardware is a bolt or screw having an irregularly shaped head where the bolt or screw can generally only be turned using a special tool. In another embodiment, securing hardware 130 can be in the form of a spring loaded plunger. One type of spring loaded plunger generally has a housing, a plunger that is slidably engaged with the housing, and a biasing member to bias the plunger relative the housing. The plunger is typically lockable in at least one position. An example of this type of spring loaded plunger is a "spring loaded plunger assembly" made by Penn Engineering™. However, it will be appreciated by those skilled in the art that other types of hardware can be used, including but not limited to screws and bolts.

It is to be appreciated that the particular type and shape of the mounting interfaces and the engagement members shown in the Figures and described herein are only meant as examples and are not meant to limit the scope of the present disclosure. Other types and forms of mounting interfaces and engagement members for engaging a slatwall will be apparent to those skilled in the art.

As mentioned above, FIG. 3 shows stand 10 being used as one component of a workstation, whereby work platform 100 and a display are mounted on stand 10. Work surface 105 of work platform 100 supports a keyboard on its upper side and a computer tower from its lower side. FIG. 6 shows stand 10 and work platform 100 being used in another configuration, in which two displays and a computer tower are mounted on stand 10. It is to be appreciated that stand 10 can be used to mount one or more pieces of equipment or other objects in any desired arrangement or configuration.

The stand of the present invention has many different uses. For example, the stand can be used as a temporary stand or workstation since a work platform and other equipment can be quickly and easily mounted onto and dismounted from the stand. In addition, the foldable feet allow the footprint of the stand to be significantly reduced, which would be desirable when the stand is being transported or stored. The stand may also be used as a more permanent piece of furniture. Furthermore, the stand of the present invention is suitable for use in many applications, including but not limited to in workshops, factories, construction sites, offices, control centres, and kitchens.

The previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed is:

1. A stand structure for supporting equipment therefrom, the stand comprising:
   a front side and a back side;
   two spaced apart upright supports;
   a lateral support disposed between and connected to the upright supports, the lateral support comprising mounting means allowing equipment to be mounted at a one of a plurality of different horizontal and vertical positions on the stand; and
   two bases, each base being disposed at the bottom of a one of the two upright supports for maintaining the stand in an upright position, each base comprising a first foot, the first foot being pivotally coupled to its respective upright support, and being moveable between an extended position and a folded position, each first foot extending on a one of the front side and the back side of the stand when the first foot is in the extended position.

2. The stand structure of claim 1 wherein the mounting means are in the form of a slatwall structure.

3. The stand structure of claim 2 wherein the slatwall structure extends substantially completely along the length of the lateral support.

4. The stand structure of claim 1 wherein each base further comprises a bracket, and wherein the first foot is pivotally coupled to its respective upright support by way of the bracket.

5. The stand structure of claim 4 further comprising at least two obstructions, and wherein the bracket of each base defines a first aperture therethrough for receiving a one of the at least two obstructions to selectively retain the first foot in the extended position.

6. The stand structure of claim 5 wherein the bracket of each base defines a second aperture therethrough at a spaced apart location from the first aperture for receiving a one of the at least two obstructions to selectively retain the first foot in the folded position.

7. The stand structure of claim 1 wherein each base further comprises a second foot, the second foot extending on the other of the front side and the back side of the stand relative to the first foot.

8. The stand structure of claim 7 wherein each second foot is pivotally coupled to its respective upright support, and is moveable between an extended position and a folded position.

9. The stand structure of claim 1 wherein each base further comprises:
   a second foot, the second foot being pivotally coupled to its respective upright support, and being moveable between an extended position and a folded position, the second foot extending on the other of the front side and the back side of the stand relative to the first foot when the second foot is in the extended position; and
   a bracket,
   wherein the first foot and second foot are pivotally coupled to their respective upright support by way of the bracket.

10. The stand structure of claim 1 wherein the first foot is moved into the folded position by pivoting the first foot about its pivotal coupling substantially towards its respective upright support.

11. The stand structure of claim 1 wherein the first foot is moved into the folded position by pivoting the first foot about its pivotal coupling substantially in a plane that is parallel to a ground surface on which the stand rests.

12. A stand structure for supporting equipment therefrom, the stand comprising:
    a front side and a back side;
    two spaced apart upright supports;
    a lateral support disposed between and connected to the upright supports, the lateral support comprising mounting means allowing equipment to be mounted at a one of a plurality of different horizontal and vertical positions on the stand; and
    two bases, each base being disposed at the bottom of a one of the two upright supports for maintaining the stand in an upright position, each base comprising a first foot, the first foot being releasably coupled to its respective upright support, each first foot extending on a one of the front side and the back side of the stand when the first foot is coupled to its respective upright support.

13. The stand structure of claim 12 wherein the mounting means are in the form of a slatwall structure.

14. The stand structure of claim 13 wherein the slatwall structure extends substantially completely along the length of the lateral support.

15. The stand structure of claim 12 wherein each base further comprises a bracket, and wherein the first foot is releasably coupled to its respective upright support by way of the bracket.

16. The stand structure of claim 15 further comprising at least two obstructions, and wherein the bracket of each base defines a first aperture therethrough for receiving a one of the at least two obstructions to selectively retain the first foot in connection with its respective bracket.

17. The stand structure of claim 12 wherein each base further comprises a second foot, the second foot extending on the other of the front side and the back side of the stand relative to the first foot.

18. The stand structure of claim 17 wherein each second foot is releasably coupled to its respective upright support.

19. The stand structure of claim 12 wherein each base further comprises:
- a second foot, the second foot being releasably coupled to its respective upright support, the second foot extending on the other of the front side and the back side of the stand relative to the first foot; and
- a bracket,
- wherein the first foot and second foot are releasably coupled to their respective upright support by way of the bracket.

* * * * *